United States Patent [19]

Ackermann et al.

[11] Patent Number: 4,563,854
[45] Date of Patent: Jan. 14, 1986

[54] ROUND BALER FOR FORMING BALES OF AGRICULTURAL PRODUCTS

[75] Inventors: Gustav Ackermann, Harsewinkel; Gerhard Clostermeyer, Gütersloh; Werner Müller, Harsewinkel, all of Fed. Rep. of Germany

[73] Assignee: CLAAS OHG, Harsewinkel, Fed. Rep. of Germany

[21] Appl. No.: 634,614

[22] Filed: Jul. 26, 1984

[30] Foreign Application Priority Data

Jul. 28, 1983 [DE] Fed. Rep. of Germany ....... 3330757

[51] Int. Cl.[4] .................... B65B 41/12; B65B 63/04
[52] U.S. Cl. .................................. 53/118; 53/587; 53/389; 74/138; 83/587
[58] Field of Search ............... 53/116, 118, 587, 593, 53/389, 391; 100/5; 56/343; 74/138, 139, 140, 141; 226/156, 157; 280/246, 255; 83/587

[56] References Cited

U.S. PATENT DOCUMENTS

| | | | |
|---|---|---|---|
| 413,475 | 10/1889 | Barnes | 74/141 |
| 854,021 | 5/1907 | Brady | 83/587 X |
| 1,459,573 | 6/1923 | Cleveland | 74/138 X |
| 2,671,552 | 3/1954 | Miller | 198/589 |
| 2,813,481 | 11/1957 | Hansen | 83/587 |
| 3,964,235 | 6/1976 | Miller | 53/118 |
| 3,992,029 | 11/1976 | Washizawa | 280/255 X |
| 4,173,112 | 11/1979 | Meiners | 53/593 |
| 4,343,132 | 8/1982 | Lawless | 53/587 X |
| 4,409,784 | 10/1983 | Van Ginhoven | 100/5 X |

Primary Examiner—John Sipos
Attorney, Agent, or Firm—Michael J. Striker

[57] ABSTRACT

A baler for forming round roll bales of agricultural products includes a baling chamber in which a plurality of bale-forming rotatable rolls form a bale which is wrapped with a binding tape supplied into the baling chamber from the tape supply roll positioned outside and above the baling chamber. The baling chamber is formed by two portions of the housing which are hinged away from each other to discharge the formed and wrapped bale from the baling chamber. A pair of tape advancing rollers receive a starting end of the tape from the supply roll and advance it into a gap between two adjacent bale-forming rolls so that the binding tape is taken along by the rotating formed bale in the baling chamber. A counter of the number of revolutions of at least one of the advancing rollers is provided, which causes cutting off a tape portion from the binding tape by a control device after the number of revolutions of the advancing roller has reached an adjusted number.

12 Claims, 6 Drawing Figures

ROUND BALER FOR FORMING BALES OF AGRICULTURAL PRODUCTS

BACKGROUND OF THE INVENTION

The present invention relates to a round baler for forming round roll bales from agricultural products being harvested.

Known round balers for agricultural uses, namely for forming bales of hay, straw or similar crops, are provided with an implement which picks hay or similar crop up from the ground upon the traveling of the tractor along a straw swath and guides the straw or hay into a baling chamber where the bale is formed by packing fingers or baling rolls. In order to tie the formed bale with a binding material, such as a tape or a film, a tape supple roll is mounted on the housing of the baler, from which the starting end of the tape is guided by means of driven advancing rollers into a clearance or play which is formed by the straw picked up from the ground and the wrapped-up straw mat. During a further baling or winding-up of the straw the front end of the binding tape is clamped and wrapped about the wound straw. However, in this conventional device there is a danger that the starting end of the binding tape would not be always taken along by the rotating bale and the supply of the binding material would be interrupted.

One of the balers of the type under consideration has been described in applicant's U.S. Pat. No. 4,185,446. The bale-forming device disclosed in this patent is a mobile baler for hay or like crop material, which comprises a baling chamber defining an inlet opening and a bale discharge gate opposite the inlet opening; pick up device including means for feeding the picked up crop material into the inlet opening under a feeding pressure; and an openable holding device arranged in the baling chamber between the inlet opening and the discharge gate to stop the incoming crop material until it reaches a predetermined baling pressure and subsequently to pass the baled material towards the discharge gate. The mobile baler is also provided with knot-tying mechanisms for forming knots on the twines which extend around the bale being formed in the baling chamber.

U.S. Pat. No. 4,366,665 discloses a round baler provided with a supply roll of plastic film and a pair of nip rolls for engagement with the outer end of the film of the supply roll.

The disadvantage of the known otherwise satisfactory devices is that a high consumption of the binding material and thus its losses take place between the extreme positions of the agricultural product being treated with the rolled binding tape. Furthermore, the process of loosening of the tape wrapped around the bale during the use of the bale is rather difficult.

SUMMARY OF THE INVENTION

It is an object of the present invention to provide a bale-forming device, in which considerable savings in the binding material to tie-up the bales being formed and in the time of the wrapping of the binding material around the bales in the baler would be obtained.

This and other objects of the invention are attained by a round baler for forming roll bales of agricultural products, comprising a housing; rotatable bale-forming rolls arranged in said housing and spaced from each other; a binding tape supply container mounted on said housing and accommodating a tape supply roll supplying the binding tape to be wrapped around the bale being formed by said rolls; cutoff blade means for cutting off tape portions of a predetermined length from the binding tape supplied from said roll; and a pair of tape advancing rollers receiving a starting end of the binding tape from the tape supply roll, at least one of said tape advancing rollers being rotated after a bale has been formed by said bale-forming rolls in said housing so as to advance said starting end into a space between two neighboring bale-forming rolls, whereby the binding tape is taken along by said bale-forming rolls and the formed bale and is completely wrapped around the formed bale.

The baler may further include drive means for rotating said at least one advancing roller, said drive means including a drive wheel and a free-wheeling means, said rotatable advancing roller being connected to said drive wheel by said free-wheeling means.

For ensuring a good function of that at least one advancing roller its outer surface may have high coefficient of friction.

The drive means may further include a drive chain partially embracing said drive wheel and having ends secured to said housing, a pivotable lever, and two deflection rollers rotationally supported on said pivotable lever, said drive chain running over said deflection rollers.

The drive chain may be a roller chain.

The pivotable lever may have a pivot pin arranged in the middle of the pivotable lever, said pivot pin being supported in said housing, said pivotable lever being pivotable about said pin and having two opposite ends, said deflection rollers being positioned at said two opposite ends, respectively.

It is advantageous that the drive means further include a hydraulic piston-cylinder unit having a piston connected to said pivotable lever and actuating the latter for a pivotal motion.

The cutoff means may include a pivotable blade holder and a blade supported in said blade holder, said blade holder being pivotable between an operative position in which said blade cuts off a tape portion from the binding tape pulled from said supply roll and an inoperative position, in which said blade is removed from the binding tape.

The cutoff means may further include a support shaft which supports said blade holder for a pivoting movement.

The baler may include locking means for locking said blade holder carrying said blade in said inoperative position.

The locking means may include a locking lever connected to said blade holder and having a latch, and a stop, said latch being lockable behind said stop.

The locking means may further include a lifting magnet having a plunger, said plunger being actuated to press against said locking lever so as to lock said latch behind said stop.

The cutoff means may further include a compression spring unit having a compression spring and a rod biased by said spring and connected to said blade holder, said compression spring prestressing said blade holder in said inoperative position.

The baler may further comprise means for returning said blade holder to said inoperative position after said blade has cut off a tape portion from the binding tape.

The returning means may include a returning lever connected to said support shaft, said pivotable lever having an abutment provided with an abutment roller, said abutment roller cooperating with said returning lever to return said blade holder to said inoperative position after a tape portion has been cut off from the binding tape.

The baler may include control counting means connected to said at least one advancing roller to count its number of revolutions upon its rotation, said counting means being also connected to said locking means and being operative for releasing a locking of said blade holder after a predetermined number of revolutions of said at least one advancing roller has been reached.

The baler may further include a hydraulic control device which is manually operated after a bale has been formed by the bale-forming rolls to cause together with said control counting means an advancing of the binding tape, a wrapping the binding tape around a formed bale, a cutting off a tape portion and a discharge of the wrapped bale from the baler independently from each other.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENTS

Figure 1:
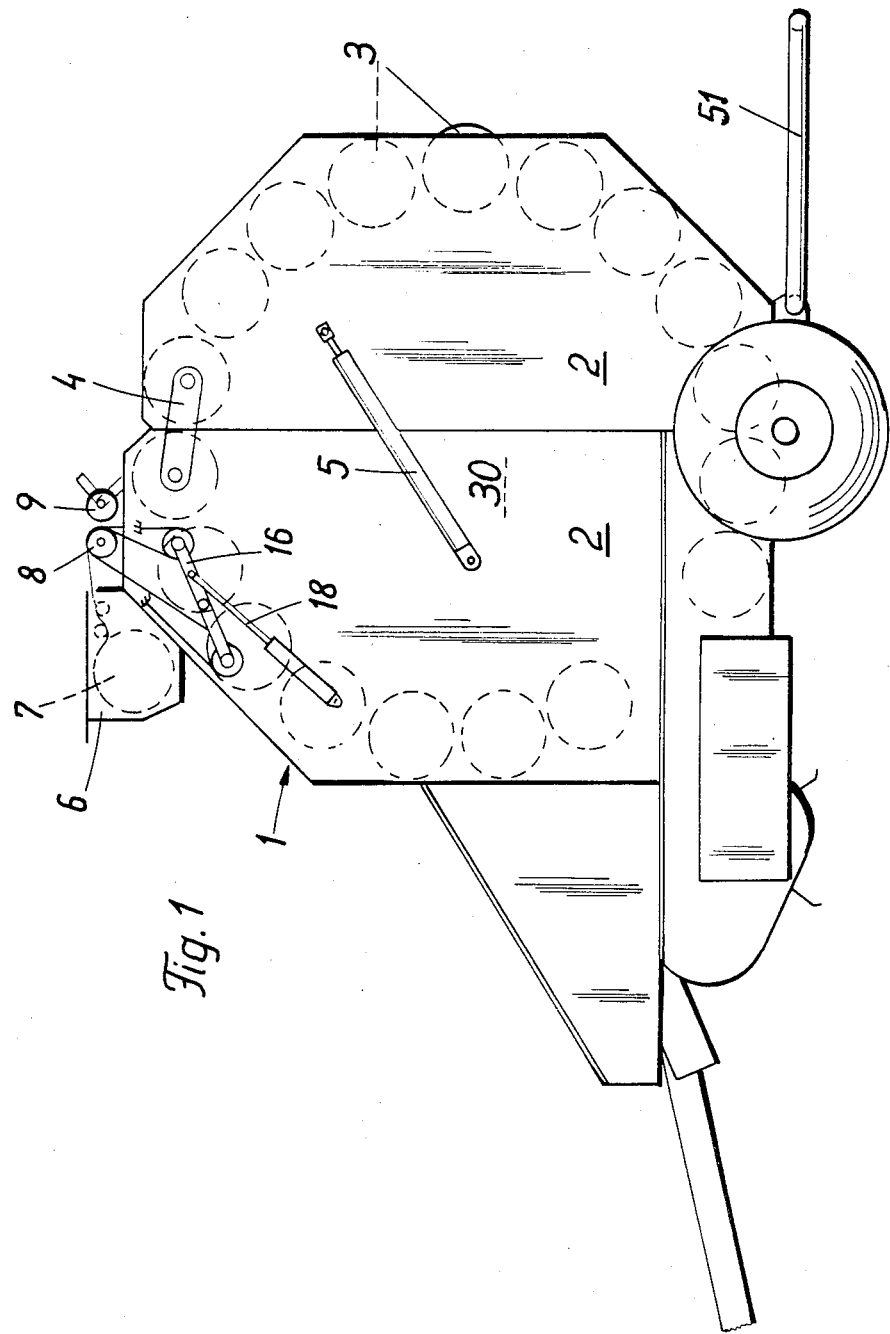
FIG. 1 is a schematic side view of the round baler according to the invention.

Referring now to the drawings in detail, and first to FIG. 1 thereof, reference numeral 1 identifies the round baler for forming round roll bales in toto. The round baler is composed in the conventional fashion of two individual housing halves 2, in which rotatable bale-forming rolls 3 are positioned. Side walls 2 of the baler housing and bale-forming rolls 3 peripherally arranged in this housing define a suitable baling chamber 30' in the conventional manner. Both rear side wall portions of the baler are connected to the front side wall portions by means of shackles 4. Two housing portions for discharging a formed bale, designated by reference numeral 4' shown in FIG. 3, from the baling chamber are pivotable towards and away from each other together with the assigned baling rolls by means of two laterally arranged closing cylinders 5, only one of which is shown in FIG. 1.

Figure 2:
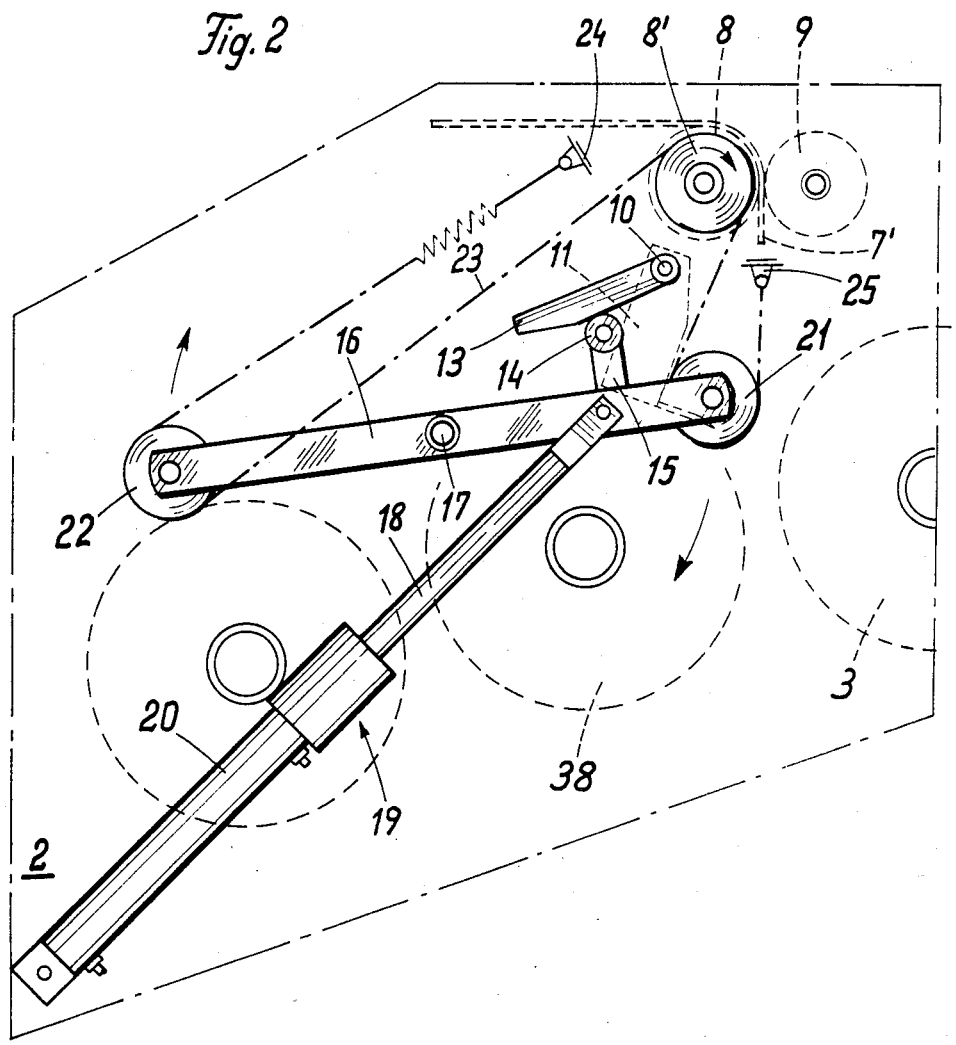
FIG. 2 is a schematic side view of a tape-pulling device of the baler in the inoperative position.

A box 6 is arranged on the upper inclined wall of the front portion of the baler housing, which box is rigidly secured to that wall. A binding tape supply roll 7 is positioned in box 6, which extends over the entire width of the formed bale. With further reference to FIG. 2 it is seen that the outer end 7' of the binding tape to be wrapped around a formed round roll bale is held by an advancing roller 8 and a counter roller 9 cooperating with roller 8. A supporting shaft 10 rotationally supported between two side walls 2 is positioned below advancing roller 8. Supporting shaft 10 carries a knife holder 11 holding a knife or blade 12 the cutting edge of which is longer than the width of tape supply roll 7. A lever 13 is welded to the end of supporting shaft 10. In the position illustrated in FIG. 2 lever 13 abuts against a roller 14 provided on an abutment 15. The latter is a portion of a pivotable lever 16 which is pivotally supported on a pin 17 arranged in the middle of lever 16 and connected to the side walls 2. To obtain a pivoting motion of lever 16 a piston-cylinder unit 19 is provided, the piston rod 18 of which is engaged on the lever 16 whereas the cylinder of which is rigidly secured to the side wall 2 of the housing of the baler. Pivotable lever 16 supports at two opposite ends thereof deflection rollers 21 and 22 over which a roller chain 23 runs, as could be seen in FIGS. 2 and 3. The roller chain 23 itself is at its one end connected to one cantilever 24 rigidly fastened to the side wall 2 while the other end of chain 23 is connected to another cantilever 25 also fastened to the side wall 2. The roller chain 23 is guided from cantilever 24 over the deflection roller 22, then over a chain wheel 8', and over deflection roller 21 towards the cantilever 25. In the position of the baler shown in FIG. 2 blade 12 is additionally position-secured. This is attained by means shown in FIG. 4. This means includes a locking lever 26 hingedly connected to the knife or blade holder 11. Locking lever 26 is provided with a pawl or latch 27. A plunger 28 of a lifting magnet 29 presses against the locking lever 26 and thereby rigidly holds the pawl or latch 27 behind a stop element 30. The blade-holding means further includes a compression spring unit 32 provided on the blade holder 11. A rod 31 of the compression spring unit 32 engages the blade holder 11 near the locking lever 26. The compression spring 36 is prestressed between a washer or disc 33 connected to rod 31 and a bearing 34 connected to the side wall 2. Lifting magnet 29 is a commonly known electromagnet with the actuated plunger 28.

Figure 3:
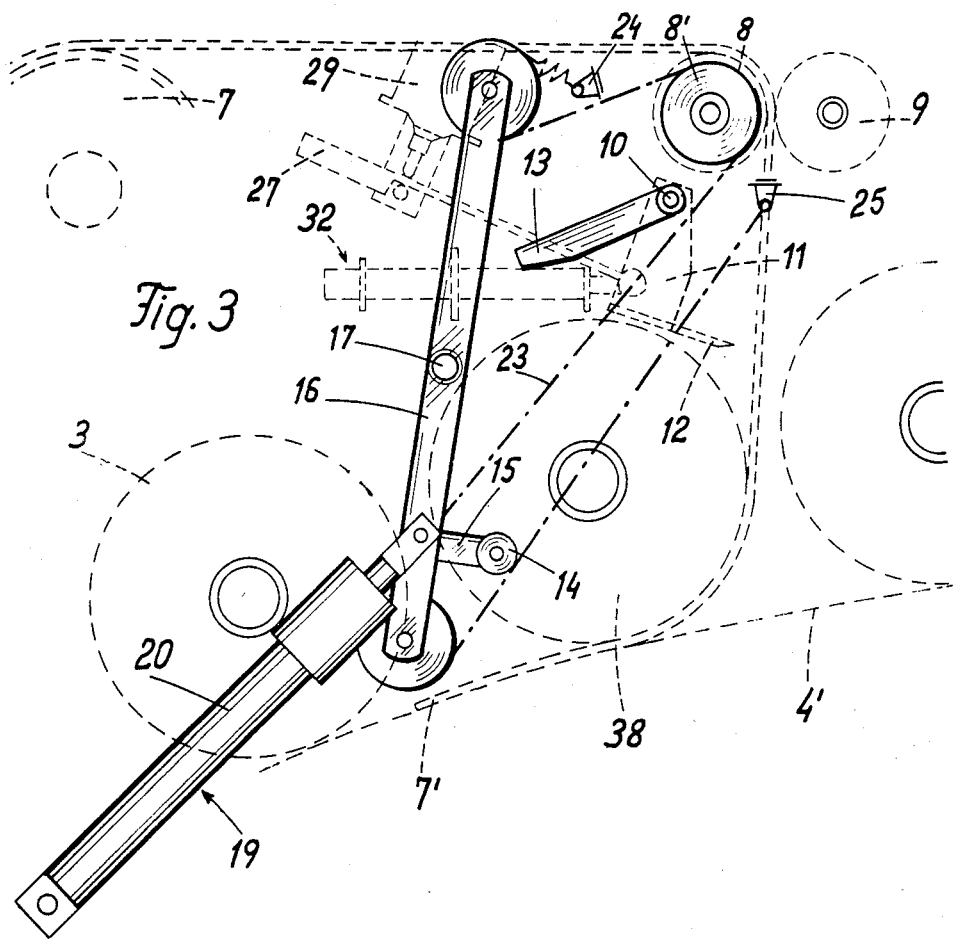
FIG. 3 is a schematic side view of the tape-pulling device of FIG. 2 but in the operative position.
Figure 4:
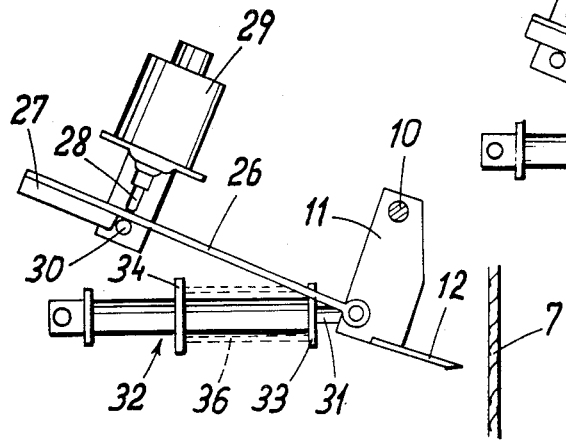
FIG. 4 is a schematic side view of a tape-cutoff device in a locked position.
Figure 5:
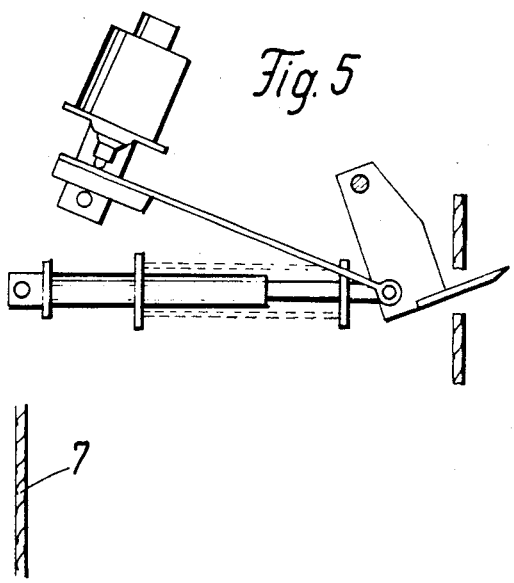
FIG. 5 is a side view of the tape-cutoff device of FIG. 4 but in an unlocked position.

Lever 16 can be pivoted from the position illustrated in FIG. 2 to the position shown in FIG. 3 by moving the piston rod 18 into its cylinder. Upon the pivoting movement of lever 16 deflection rollers 21 and 22 take such a position that the advancing roller 8 is rotated by roller chain 23 in the clockwise direction a predetermined number of revolutions and thereby the starting end 7' of the tape is guided between the formed bale 4' and the baling roll 38. Tape-advancing roller 8 is provided in the usual manner with a free-wheeling element which permits the rotational movement of this roller only in the clockwise direction. Tape-advancing roller 8 has the outer surface which has a high friction coefficient. The lifting magnet 29 at this point locks the blade 12 in the inoperative position. After bale 4' has been rotated by baling rolls 3 and 38 sufficiently long to permit the bale to be completely wrapped with the tape pulled from the tape supply roll 7 lifting magnet 29 releases blade 12 which due to the force of compression spring 36, is forced towards the tape, as shown in FIG. 5, and cuts the tape off. Then bale 4' wrapped by the tape is discharged from the baling chamber 30' of the baler and lever 16 is pivoted back to the position shown in FIG. 2. During this movement a roller 14 provided on the abutment 15 of the pivotable lever 16 comes into contact with holder-returning lever 13 and thereby rotates blade holder 11 back or in the counterclockwise direction about the shaft 10 until spring 36 is again prestressed and pawl or latch 27 comes in engagement with stop 30. Stop 30 is again locked by lifting magnet 29.

Figure 6:
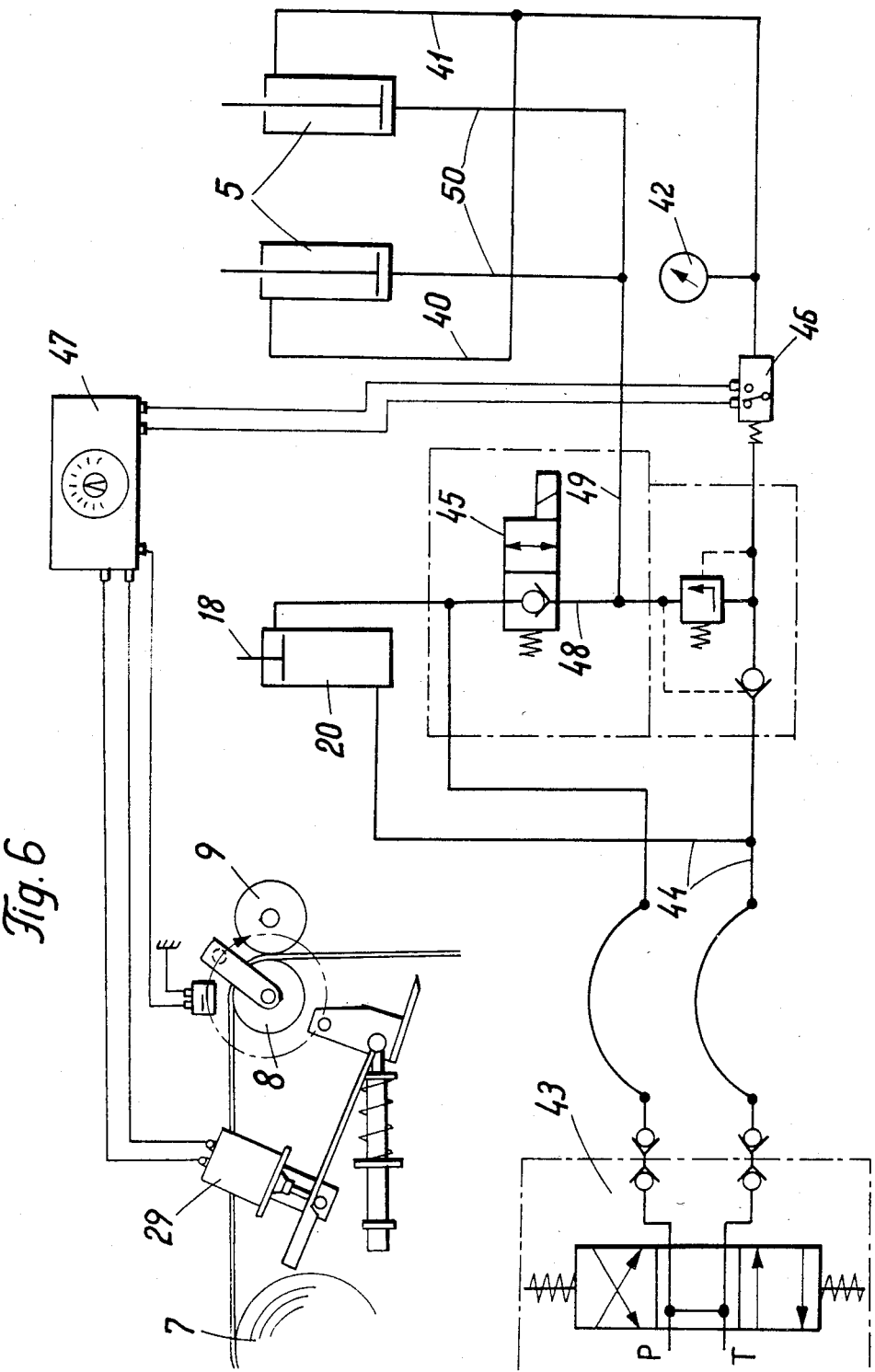
FIG. 6 is a diagram illustrating the operation of the round baler of the invention.

The functions of the above-described components of the baler will be now described with reference to FIG. 6. As soon as bale 4' being formed by baling rolls 3 in the conventional fashion in the baling chamber 30' is sufficiently rigid and large this bale presses against the baling rolls connected with the swingable wall portions of the housing whereby a pressure is built up in closing cylinders 5, which occurs in conduits 40 and 41 and is indicated on a manometer 42. This pressure is indicated by a warning lamp to the operator of the baler. The operator or the tractor driver then stops the tractor and manually switches over a control valve 43 so that pressure oil can flow through a conduit 44 into cylinder 20 of the piston-cylinder unit 19 to move piston rod 18 outwardly from the cylinder. A valve 45 has still no oil flow and is locked while the lifting magnet 29 is supplied with voltage and is driven out and a pressure switch 46 is closed (the pressure oil is above a switch point). During the withdrawal of the tape from the tape supply roll 7 by the movement of the piston rod 18, as has been described above, and further moving of the tape about the rotating bale 4' the number of revolutions of advancing roller 8 are counted by an adjustable central control device 47. After the number of revolutions of the advancing roller 8 has reached a predetermined or preadjusted number, which has been arranged in accordance with an agricultural product being treated and a desired degree of wrapping the bales with the tape, the central control device 47 switches off the lifting magnet 29 whereby blade 12 becomes released and cuts off the tape. Valve 45 at this moment is supplied with voltage and operates so as to permit pressure oil flowing through conduits 48, 49 and 50 into the closing cylinders 5 which thereby open the baling chamber 30' to discharge the bale therefrom. The bale then is pushed onto the arable soil by a spring-biased supporting rake 51 shown in FIG. 1. After the formed bale has fallen on the soil rake 51 takes the position shown in FIG. 1 and a driver receives a signal about the bale discharge from the baler. The driver then again actuates the control valve 43 so that closing cylinders 5 move the portions of the housing to close the baling chamber 30'. Simultaneously the piston rod of piston-cylinder unit 19 is moved outwardly and retracts blade 12. Pressure switch 46 at this point is open because the oil pressure is below the switching point. If the baling chamber 30' is closed and piston-cylinder unit is actuated to draw the piston rod into its cylinder a certain pressure is built up in the entire system, supplied from the tractor hydraulic system, this pressure is indicated on the manometer 47 and the driver can continue his trip. The pressure switch 46 is switched on and actuates electro-magnet 29 so that the latter locks the blade 12. The control device 47 is brought to a zero position and valve 45 is again locked.

It should be noted that the electromagnet 29, valves 43 and 45, manometer 42, the pressure switch 46, the control 47 and the conduit system 40, 41, 48, 49, 44 and 50 are of any suitable conventional constructions and therefore are not described herein in greater detail.

It should be noted that only those components, which are essential to the present invention, have been described in detail herein above. The remaining components of the baler, such as a mobile frame, pick-up implement etc. are conventional and are disclosed, for example in the above mentioned U.S. Pat. No. 4,185,446 the entire disclosure of which is incorporated herein by reference.

It will be understood that each of the elements described above, or two or more together, may also find a useful application in other types of round balers differing from the types described above.

While the invention has been illustrated and described as embodied in a round roll baler, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A round baler for forming roll bales of agricultural products comprising a housing; rotatable bale-forming rolls arranged in said housing and spaced from each other; a binding tape supply container mounted on said housing and accommodating a tape supply roll supplying the binding tape to be wrapped around the bale being formed by said rolls; cutoff blade means for cutting off tape portions of a predetermined length from the binding tape supplied from said roll, said cutoff means including a pivotable blade holder, a blade supported in said blade holder and a support shaft which supports said blade holder for a pivoting movement, said blade holder being pivotable between an operative position in which said blade cuts off a tape portion from the binding tape pulled from said supply roll and an inoperative position in which said blade is remote from the binding tape, a pair of tape advancing rollers receiving a starting end of the binding tape from the tape supply roll, at least one of said advancing rollers being rotated after a bale has been formed by said bale-forming rolls in said housing so as to advance said starting end into a gap between two neighboring bale-forming rolls, whereby the binding tape is taken along by said bale forming rolls and the formed bale and is completely wrapped around the formed bale; drive means for rotating said at least one advancing roller, said drive means including a drive wheel connected to said one advancing roller, a pivotable lever having two deflection rollers rotationally supported on said pivotable lever, a hydraulic piston-cylinder unit for pivoting said pivotable lever, and a drive chain running over said deflection rollers and said drive wheel to rotate the latter upon a pivoting motion of said pivotable lever; and means for returning said blade holder to said inoperative position after said blade has cut off a tape portion from the binding tape, said returning means including a returning lever connected to said support shaft, said pivotable lever having an abutment provided with an abutment roller, said abutment roller cooperating with said returning lever to return said blade holder to said inoperative position after a tape portion has been cut off from the binding tape.

2. The baler as defined in claim 1, wherein said rotatable advancing roller has an outer surface of high coefficient of friction.

3. The baler as defined in claim 1, wherein said drive chain is a roller chain.

4. The baler as defined in claim 1, wherein said pivotable lever has a pivot pin arranged in the middle of the pivotable lever, said pivot pin being supported on said housing, said pivotable lever being pivotable about said pin and having two opposite ends, said deflection rollers being positioned at said two opposite ends, respectively.

5. The baler as defined in claim 4, wherein said a hydraulic piston-cylinder unit has a piston connected to said pivotable lever and actuating the latter for a pivotal motion about said pin.

6. The baler as defined in claim 1, wherein said blade has a smooth cutting edge.

7. The baler as defined in claim 1, further including means for locking said blade holder carrying said blade in said inoperative position.

8. The baler as defined in claim 7, wherein said locking means include a locking lever connected to said blade holder and having a latch, and a stop, said latch being lockable behind said stop.

9. The baler as defined in claim 8, wherein said locking means further include a lifting magnet having a plunger, said plunger being actuated to press against said locking lever so as to lock said latch behind said stop.

10. The baler as defined in claim 9, wherein said cut-off means further include a compression spring unit having a compression spring and a rod biased by said spring and connected to said blade holder, said compression spring prestressing said blade holder in said inoperative position.

11. The baler as defined in claim 9, further including control counting means connected to said at least one advancing roller to count its number of revolutions upon its rotation, said counting means being also connected to said locking means and being operative for releasing a locking of said blade holder after a predetermined number of revolutions of said at least one advancing roller has been reached.

12. The baler as defined in claim 11, further including a hydraulic control device which is manually operated after a bale has been formed by the bale-forming rolls to cause together with said control counting means an advancing of the binding tape, a wrapping the binding tape around a formed bale, a cutting off a tape portion and a discharge of the wrapped bale from the baler independently from each other.

* * * * *